Jan. 25, 1966  H. A. LINCOLN  3,230,587
PANEL JOINING MEANS
Filed May 20, 1963

INVENTOR.
Henry A. Lincoln
BY
AGENT

United States Patent Office 3,230,587
Patented Jan. 25, 1966

1

3,230,587
PANEL JOINING MEANS
Henry A. Lincoln, Beaverton, Mich., assignor to The Dow Chemical Company, Midland, Mich., a corporation of Delaware
Filed May 20, 1963, Ser. No. 281,485
10 Claims. (Cl. 20—92)

This invention relates to the joining of composite panels. It more particularly relates to the preparation of a butt joint for composite panels having a readily deformable core.

There are commercially available many types and varieties of insulating panels which utilize a core of a relatively sufficient deformable material to which is adhered or attached face sheets such as those prepared from plywood, fiberboard, aluminum, resin, glass fiber laminates, and the like. Many of these panels are utilized for the construction of low temperature insulating space and oftentimes it is necessary to provide a secure and rigid joint without providing a protrusion such as is produced by use of stripping. Oftentimes, such relatively smooth wall construction is necessary as in cold rooms and freezers where comestibles are stored and a minimum of dirt catching corners can be tolerated. Such fasteners must not provide a direct thermal path between the inner surface and the outer surface of the panel such as would be obtained by using a metallic piece extending from face to face. Frequently in assembly of enclosures or buildings utilizing these panels, allowance must be made for minor dimensional defects in the footings, supports or even in the dimension of the panels themselves. Therefore the ideal fastener should be capable of being readily field installed.

Therefore, it is an object of this invention to provide a fastener for use with sandwich panels having readily deformable cores which may be rapidly and easily installed.

It is a further object of this invention to provide a fastener for sandwich panels having readily deformable cores wherein the edge portions of the panels are in abutting relationship to each other and are maintained securely in position.

It is a further object of this invention to provide an improved method for joining sandwich panels having deformable cores.

Another object of this invention is to provide a fastener which does not require any external protrusion to be evident on the panel in which it is installed.

These features and other advantages of the invention are readily achieved by securing together sandwich panels having a deformable central core by placing the panels in abutting relationship to each other, forming openings within the surface of each of the abutting panels in a predetermined spaced relationship to each other, deforming the core material adjacent the area of the openings, placing a generally discoidal body member therein said discoidal body having inwardly operating camming surfaces adapted to lie generally adjacent the openings, positioning within at least one opening in each face adjacent the deformed core a pin adapted to engage the camming surfaces and rotating said body to engage said pins and force the panels together. Also included within the scope of the present invention are certain accessory devices for the practice of the method.

These objects, further features and advantages of the present invention will become more apparent when the following specification is taken in connection with the drawing wherein:

FIGURE 1 is a view of panels having a soft deformable core joined in accordance with the invention;

2

Figure 1:
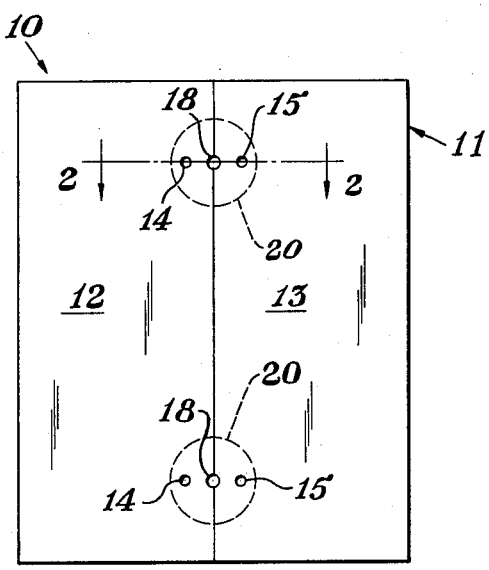

In FIGURE 1 there is schematically illustrated a panel 10 having a deformable core in abutting edge-to-edge relationship with a similar panel 11. In a surface 12 of the panel 10 are provided circular openings 14. Similar openings 15 are provided in the surface of panel 11. Within the openings or holes 14 and 15 are disposed the pins 17. Semi-circular openings are provided in the edge portions of the sheets 10 and 11 which, when placed in abutting relationship, form the apertures 18. Disposed generally adjacent to and behind the surfaces 12 and 13 and adjacent to the openings 14 and 15 is a generally discoidal cam 20.

Figure 2:
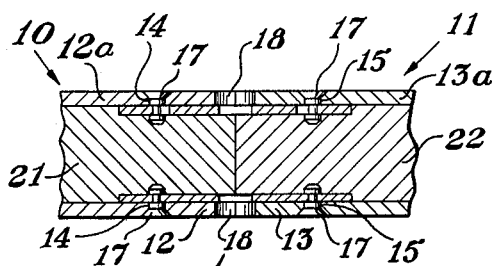
FIGURE 2 is a schematic sectional view of a joint in accordance with the invention.

In FIGURE 2 there is illustrated a sectional view of a portion of the panels 10 and 11 taken along the line 2—2 of FIGURE 1. FIGURE 2 shows the relationship of the surfaces 12, 12a, 13 and 13a, separated and adhered to the deformable core material 21 and 22 respectively. The core material 21 and 22 is separated from the surfaces 12, 12a, 13 and 13a in the region about the apertures 14, 15 and 18 and the discoid member 20 is positioned therein. The discoid camming member 20 engages the pins 17 which are positioned in the apertures 14 and 15 of the sheets 10 and 11.

Figure 3:
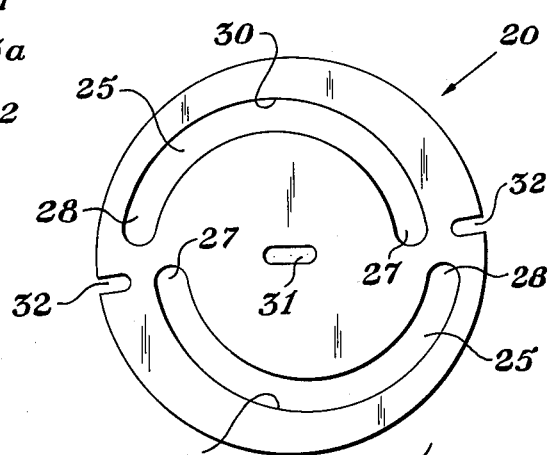
FIGURE 3 illustrates an embodiment of a discoid body having opposed camming surfaces.

FIGURE 3 depicts a detailed plan view of a camming member 20 in accordance with the invention. The camming member 20 comprises a generally flat discoidal sheet defining therein a pair of generally disposed helically arranged slots 25. Each of the slots 25 has a centrally disposed terminal portion 27 and a generally circumferentially disposed portion 28. The slots 25 are arranged to provide an inwardly facing surface 30 which is at a varying distance from the geometric center of the disc. The two slots 25 are so constructed and arranged that rotation of the disc in a given direction causes two equally spaced points on a non-rotating diameter of the discoid member to approach or recede from the center as the disc is rotated. Thus the surfaces 30 provide inwardly facing camming surfaces which are operable by rotation of the disc. Centrally disposed within the disc is an aperture or tool engaging means 31. The circumference of the disc 20 defines a plurality of serrations 32.

Figures 4, 6:
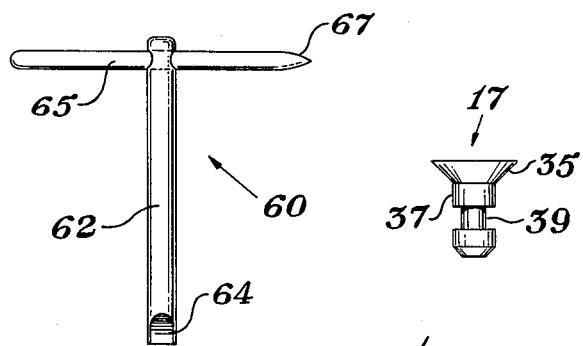
FIGURE 4 depicts a pin.

In FIGURE 4 there is illustrated a pin particularly suited for the practice of the present invention generally designated by the reference numeral 17. The pin 17 comprises a head 35 and a body portion 37. The body portion 37 defines a generally circumferential recess 39.

Figure 5:
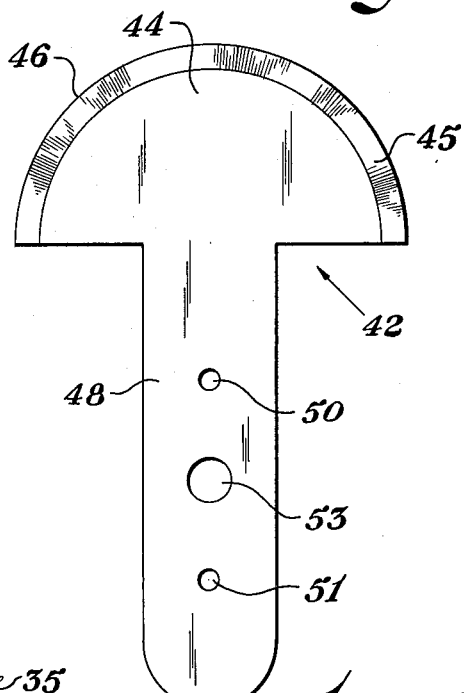
FIGURES 5 and 6 are accessory tools for the preparation of a joint such as shown in FIGURE 1.

In FIGURE 5 there is illustrated a tool for the installation of fasteners in accordance with the invention generally designated by the reference numeral 42. The tool 42 comprises a blade portion 44. The blade portion 44 is generally semi-circular in shape and is terminated on its curved edge by a chamfer 45 resulting in an edge 46. Coplanar with and rigidly attached to the blade portion 44 is a handle portion 48. Within the handle portion 48 are disposed a pair of similarly sized apertures 50 and 51. Centrally disposed between the apertures 50 and 51 is an aperture 53.

In FIGURE 6 there is illustrated a side view of a second tool generally designated by the reference numeral 60. The tool 60 comprises a body portion 62 terminated at one end by a flat blade 64 and at the opposite end by a generally cylindrical cross member or handle 65. One end of the handle 65 tapers to a dull point 67.

In the practice of the method of the invention rigid panels are readily joined by placing them in abutting relationship, placing a tool such as tool 42 of FIGURE 5 over the joint of the panels in such a manner that the aperture 53 is generally centered over the crack formed by the abutting surfaces. The apertures 50 and 51 extend generally normal to the direction of the crack. By means of a suitable tool such as a drill the skin or surface of the panel is removed in the locations indicated by the tool. A sufficient number of perforations are made in the two panels to receive as many fasteners as are to be utilized in the joining of the panels. For example, in FIGURE 1 two sets of three holes would be formed to receive the two fasteners. The panels are then moved apart by displacement in the plane of the panels or in an alternate direction which permits access to the edge of the panels. As a deformable core such as plastic foam is utilized the blade of the tool 42 is inserted at the point of juncture of the foam and the skin or surface of the panel and is pressed inwardly into the core and parallel to the skin until the entire semi-circle of the blade has been inserted. The blade of the tool 44 preferably approximates the diameter of the discoidal camming member 20. The precise relationship between the blade and the cam will depend upon the particular materials utilized. Thus if a relatively flexible and easily deformable core has been employed in the preparation of the panel it is desirable that the radius of the semi-circular blade be somewhat less than the radius of the discoidal camming member. However, if the material is resilient usually it is advantageous to employ a tool having a radius slightly larger than the discoidal camming member. On removal of the blade usually the deformable core has been deformed and separated from the inner surface of the facing sheet and it is possible to manually force the discoidal camming member between the deformable core and the inner surface of the facing sheet. The discoidal camming member is then forced into the sheet in such a manner that the terminal portion 28 of a slot 25 is situated beneath one of the apertures provided in the sheet such as 14 and 15 of FIGURE 1, whereupon the pointed end of the handle 65 of the tool 60 may be used to temporarily restrain the camming member while the portion of the camming member not enclosed by the first sheet is inserted into a like portion in the second sheet. The pointed end of the handle 65 of the tool 60 which has served as an alignment pin is then withdrawn and a pin such as 17 inserted into the opening from which the alignment pin was removed. The alignment pin portion of the tool 60 is then used to align the opposite slot with the hole in the surface and a second pin such as 17 is inserted. The tool 60 is then utilized to engage the discoidal camming member 20 by placing the blade 64 of the tool 60 within the slot 31 of the camming disc 20 through the aperture such as 18 and corresponding to the aperture indicated by the opening 53 and tool 42. Thus, by twisting the camming members 20 the sheets or panels are drawn into tight and permanent alignment. The pins such as 17 having an annular recess 39 are adapted to receive the camming member 20 within the annular recess thus preventing the pins from being withdrawn. The serrations 32 about the periphery of the discoidal cam 20 provide means to engage the inner surface of the facing sheets 12 and 13 as well as the deformable core material 21 and prevent the rotation of the camming member and subsequent release of the tight joint. It is critical for the operation of the present invention that the camming members be fabricated from a flat sheet and have a final configuration which is equal in thickness to about the thickness of the sheet from which the camming members were formed; beneficially such camming members are readily prepared for relatively low cost by punching from a metal sheet. The relatively flat form of camming member in accordance with the invention is particularly advantageous as it does not extend into the deformable core of the panel for a significant distance and thus contributes little or nothing to the thermal path from one side of the sheet to the other. Further such discoidal camming devices are readily stacked in a minimum space for shipping and are particularly rugged and free and are not readily damaged.

Pins in accordance with the invention are readily prepared by conventional fabricating means; preferably a hardened steel is utilized for maximum strength if it is required. Such pins are fabricated with a flat head adapted to be counter-sunk as illustrated in FIGURE 4. Other configurations such as a pan head and the like are readily employed depending upon the surface finish requirements of the installation.

As is apparent from the foregoing specification, the method and article of the present invention are susceptible of being embodied with various alterations and modifications which may differ particularly from those that have been described in the preceding specification and description. For this reason it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A structure comprising at least
   a pair of sandwich panels, each of said sandwich panels having a deformable core material and at least one rigid face sheet adhered to one major surface thereof,
   said panels being in abutting edge to edge relationship,
   a discoidal camming member comprising a flat disc-like member having formed therein at least a pair of apertures defining an inwardly operating camming surface, said disc also defining a centrally disposed tool engaging means,
   said disc being positioned adjacent the inner surfaces of the facing sheets of the abutting panels and having opposed camming surfaces adjacent sheets of the different panels,
   the facing sheet of each of the panels defining an aperture adjacent the camming slots,
   said apertures in each of said sheets containing a pin adapted to engage the camming surfaces, said pin having a head portion and a body portion, the body portion of said pin defining the groove to receive the camming member and prevent motion of the pin when engaged with said camming member in a direction generally normal to the plane of the camming member,
   the heads of said pins being generally flush with the surface of said panel and being held together by the inwardly facing camming surfaces of the discoidal member.

2. The structure of claim 1 wherein the discoidal camming member is a flat sheet metal disc.

3. The structure of claim 2 wherein the apertures defining the inwardly operating camming surface extend for a radial distance approximating one-half of the disc.

4. The structure of claim 1 wherein the centrally disposed tool engaging means comprises an elongated slot.

5. The structure of claim 1 wherein the periphery of the disc-like member is provided with a plurality of notches.

6. The structure of claim 5 wherein a plurality of serrations are formed by the absence of material in the disc and the disc has thickness no greater than the material from which it was formed.

7. The structure of claim 1 wherein the pins adapted to engage the camming surfaces have a flat head and are counter sunk into the face sheet to provide a sheet without a protrusion on its surface.

8. The structure of claim 1 wherein said pin defines a generally circumferential groove adapted to receive the discoidal camming member.

9. The structure of claim 1 wherein each of the sandwich panels has a rigid face sheet adhered to the major surfaces thereof.

10. A method of joining sandwich panels having a deformable central core and at least one face sheet on the surface of said core, said core and said surface being generally coextensive at least in the region being joined, comprising
- positioning said panels in abutting edge to edge relationship,
- providing an opening within the surface of each of the abutting panels, the openings in predetermined spaced relationship to each other,
- providing a third opening spaced generally centrally between the openings within the surface of each of the abutting panels,
- deforming the core material of each of the panels adjacent the openings,
- positioning between said deformed core portion and the inner surface of the facing sheet of the panel a generally discoidal body member, said discoidal body member having inwardly operating camming surfaces adapted to lie generally adjacent the first and second openings of each of the panels to be joined,
- positioning within the first and second openings in each face a pin adapted to engage the camming surfaces and
- rotating said discoidal body to engage said pins and force the panels together.

References Cited by the Examiner

UNITED STATES PATENTS

| | | | |
|---|---|---|---|
| 117,530 | 8/1871 | Foote | 24—68 |
| 240,314 | 4/1881 | Fitzgerald | 24—68 |
| 2,647,287 | 8/1953 | Jones | 20—4 |
| 2,714,751 | 8/1955 | Stuart et al. | 20—92 |

FOREIGN PATENTS 563,849   9/1958   Canada.

FRANK L. ABBOTT, *Primary Examiner.*

JACOB L. NACKENOFF, *Examiner.*